United States Patent
Summerfield et al.

[11] 3,746,836
[45] July 17, 1973

[54] AQUARIUM HEATER

[75] Inventors: William F. Summerfield; Fleet E. Nuttall, Hermosa Beach, both of Calif.

[73] Assignee: Mattel, Inc., Hawthorne, Calif.

[22] Filed: Dec. 15, 1971

[21] Appl. No.: 208,095

[52] U.S. Cl. ............... 219/328, 219/330, 219/335, 219/510
[51] Int. Cl. ............................................ F24b 1/00
[58] Field of Search ................... 219/319, 322, 327, 219/378, 330, 335, 510, 523; 337/354

[56] References Cited
UNITED STATES PATENTS
| | | | |
|---|---|---|---|
| 2,736,791 | 2/1956 | Krah et al. | 219/327 X |
| 3,562,692 | 2/1971 | Bletz et al. | 337/354 |
| 2,784,292 | 3/1957 | Haloski | 219/327 X |
| 2,977,456 | 3/1961 | Stiebel | 219/327 X |

*Primary Examiner*—Bernard A. Gilheany
*Assistant Examiner*—F. E. Bell
*Attorney*—Abraham Friedman and Abraham Goodman

[57] ABSTRACT

An aquarium heater comprising a housing, or heater tube, in which is provided heating coils for heating the housing to a temperature higher than ambient temperature. Extending in the housing is an appropriate electral circuit for providing electrical current to the heating coils. A pair of independently actuable thermostats are operatively associated with the eletrical circuit, each for independently opening and closing the circuit selectively in response to respective external termperature levels, one of which is a safety switch for preventing the heater tube from overheating.

17 Claims, 7 Drawing Figures

Patented July 17, 1973

Patented July 17, 1973

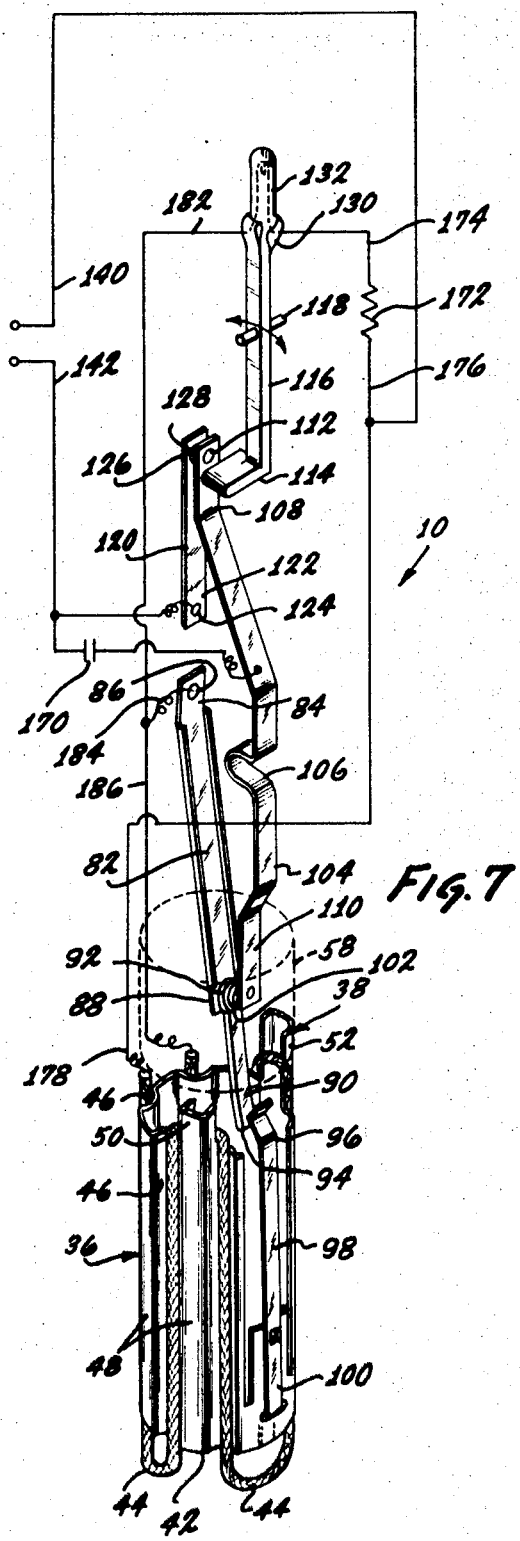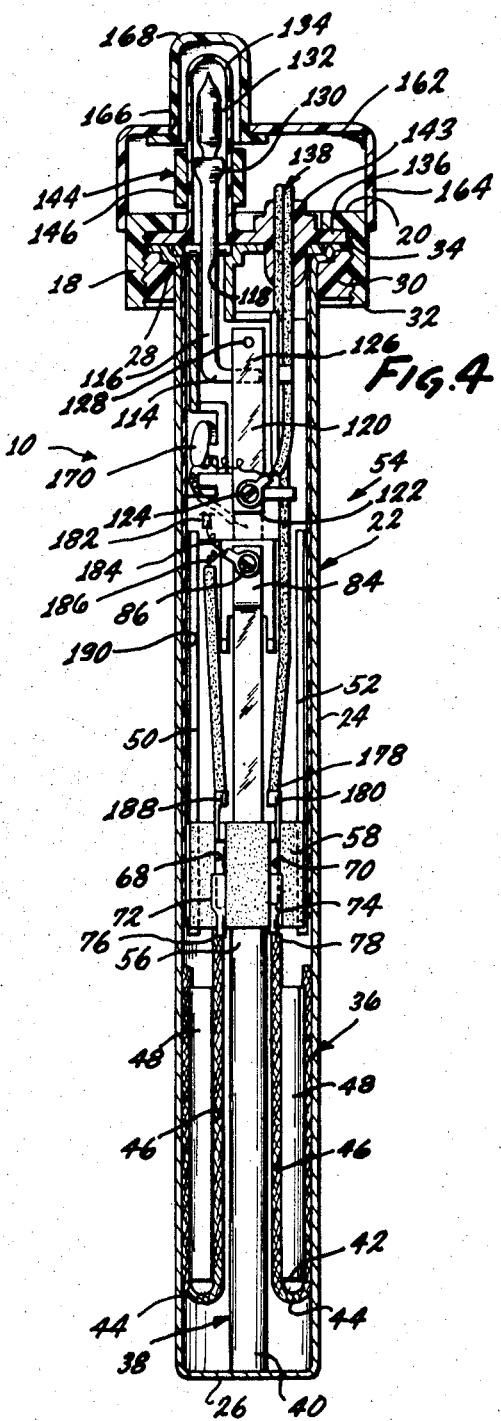

AQUARIUM HEATER

BACKGROUND OF THE INVENTION

The present invention relates generally to aquarium accessories, and more particularly to an aquarium heater.

Many home owners of aquariums use immersion type heaters to maintain the water in the aquarium at a predetermined temperature exceeding the prevailing ambient temperature. In the interest of safety, some cities have made regulations governing the construction of these heaters and certain private organizations have set safety requirements.

In this respect, the home owner or hobbyist often removes the aquarium heater from the confines of the aquarium and places the heater on any available surface. The problem with removing the heater, especially when the heater is electrically connected to a source of electrical power, is the fact that the aquarium heater will continue to remain in an energized condition and the electrical heating coils will continue to function. Clearly, as those skilled in the art will readily understand, should the heating coils continue to heat a surface in contact with the heater, the surface, if flammable, may eventually burn and cause a fire or other damage to the surrounding medium and jeopardize the safety of the hobbyist.

Moreover, in many instances, the aquarium heater is generally constituted of a glass tube, and often will fracture when subjected to great abuse or dropped from a distance upon a hard surface.

Furthermore, there are many instances wherein the conventional type of aquarium heater is subjected inadvertently to being completely immersed in the water of the aquarium, and because of the lack of suitable means for sealing the heater against fluid penetration thereinto, it is clear that under such circumstances, there results a very hazardous condition with regard to the safety of both the fish in the aquarium and the hobbyist himself who thereafter attempts to remove the submerged aquarium heater from the water.

SUMMARY OF THE INVENTION

Accordingly, it is an object of the present invention to provide an aquarium heater which includes a thermal cut-off switch which prevents overheating if the heater is taken out of the water. The idea here is that water will take up a quantity of heat. However, if the heater, which is set to maintain the water at a given temperature, is taken from the water and placed on the home owner's table, or the like, excessive heat may cause a fire or other damage.

Another object of the present invention is to provide a heater which may be completely submerged in water without danger to the user.

It is a further object of the present invention to provide a heater which includes a metal tube in place of a glass tube and, thereby, will preclude breakage from handling.

To this end, the present invention relates generally to an aquarium heater comprising a housing, said housing being at least partially metallic, electrical heating means having a heat conductive support extending in said housing for heating the latter to a temperature greater than ambient temperature, circuit means extending in said housing for supplying electrical current to said electrical heating means, and a thermostat operatively associated with said circuit means for selectively opening and closing the latter in response to external temperature levels, said thermostat including a bimetallic switching member in close proximity with, or connected to, the support of the heating means.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 4 is a cross-sectional view taken along the line 4—4 of FIG. 2;

FIG. 5 is an enlarged, cross-sectional view taken along the line 5—5 in FIG. 2;

FIG. 6 is an enlarged, cross-sectional view taken along the line 6—6 of FIG. 2; and FIG. 7 is an enlarged, partial perspective view of the heater of FIG. 1 showing its electrical wiring assembly.

DETAILED DESCRIPTION OF THE INVENTION

Figure 1:
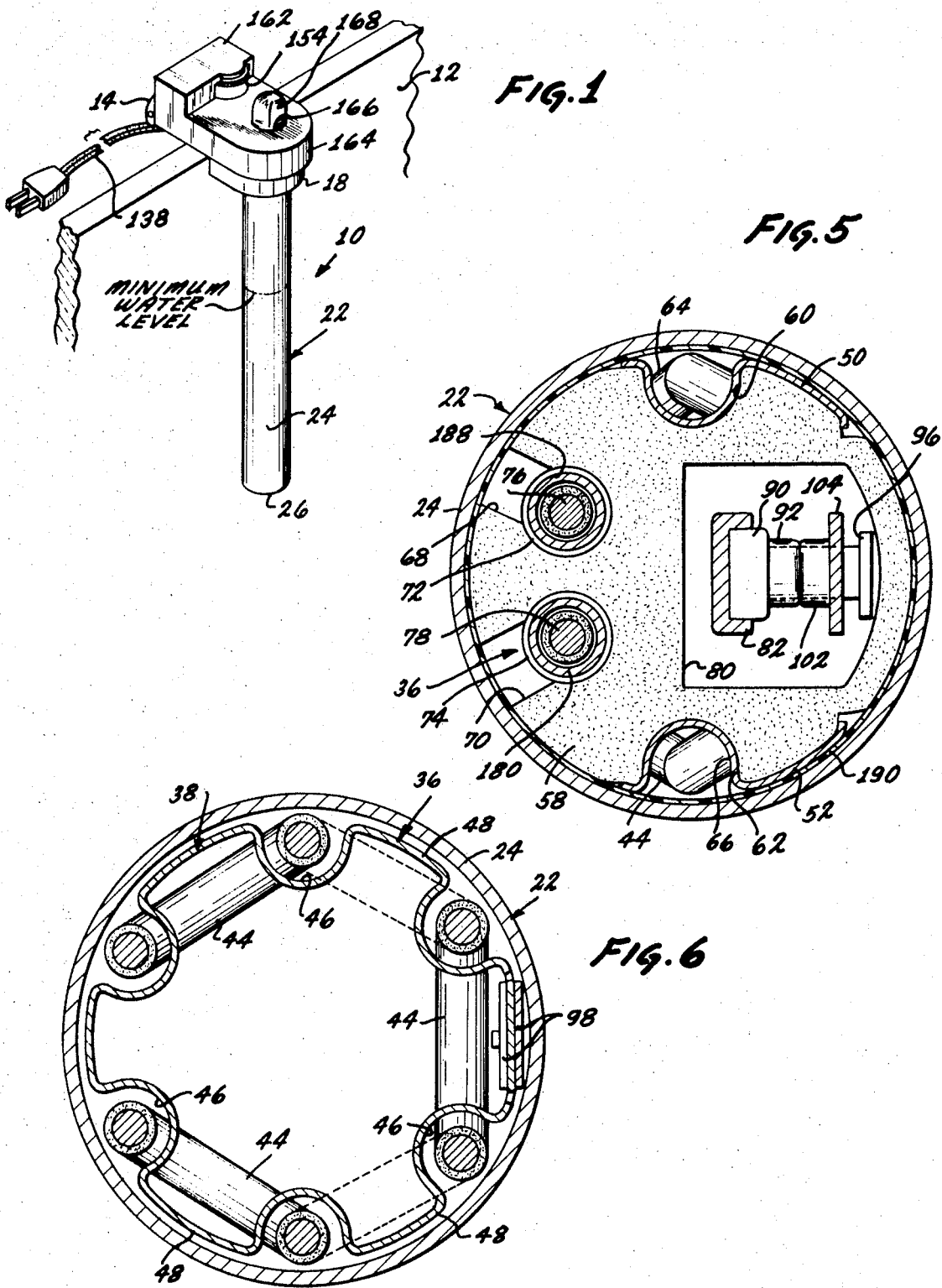
FIG. 1 illustrates a perspective view of an aquarium heater constituting a presently preferred embodiment of the invention shown in a position on the wall of an aquarium.
Figure 2:
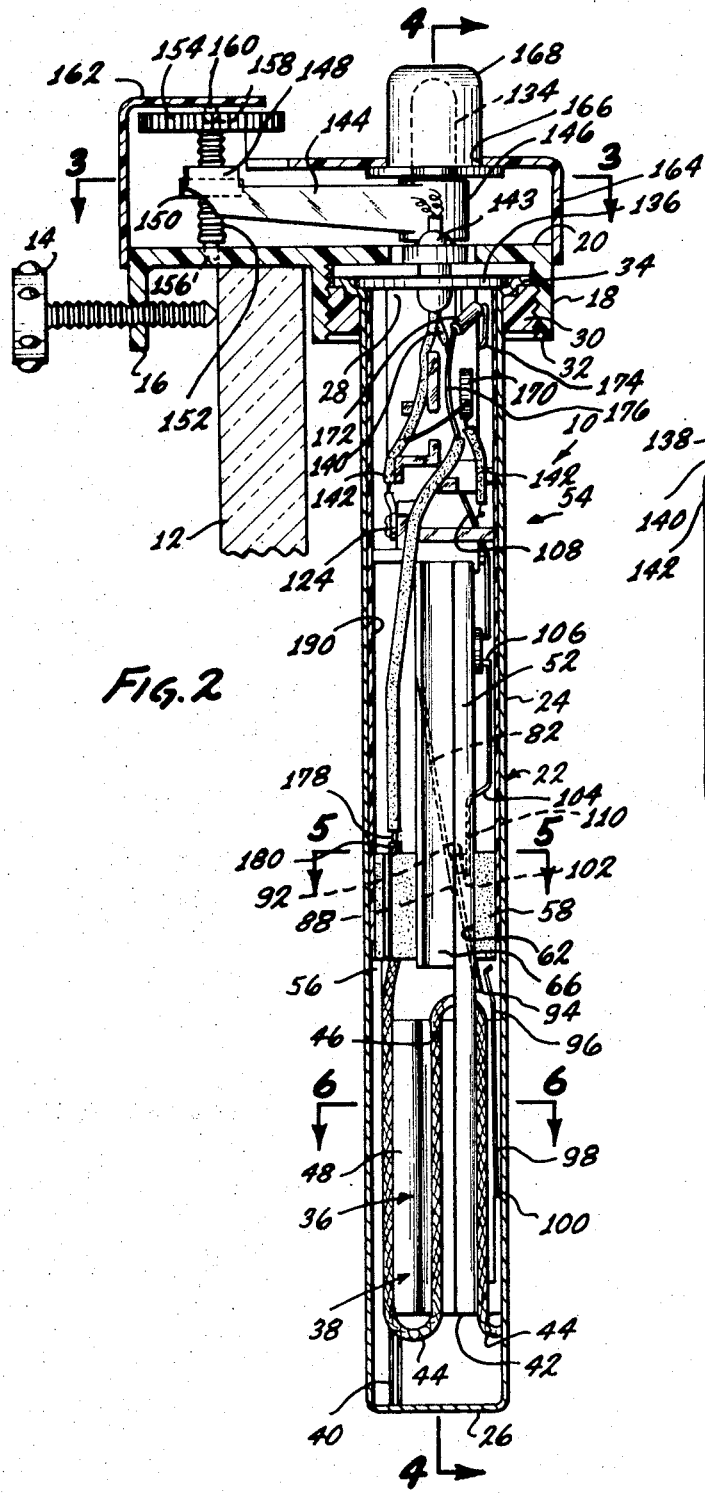
FIG. 2 is an enlarged, vertical cross-sectional view of the heater and aquarium wall of FIG. 1.

Referring now to FIGS. 1 and 2, an aquarium heater constituting a presently preferred embodiment of the invention, generally designated by the reference character 10, may be secured to a wall 12 of an aquarium (not shown) by means of a thumb screw 14 threadedly engaging or seated in a tab 16 carried by a tube support 18, the latter having a shelf 20 extending over the aquarium wall 12 for supporting the heater 10 in position thereon.

The heater 10 includes a housing comprised of a heating tube 22 which may be conventionally made from a suitable metal and which includes an encompassing side wall 24, a closed bottom wall 26 and an open top 28. Tube 22 may be connected to tube support 18 by an externally threaded plug 30 which threadedly engages an internally threaded boss 32 carried by tube support 18 for trapping an external annular flange 34 encompassing the open top 28 of the tube 22.

The tube 22 transfers heat from a suitable heating element 36 to the aquarium water to be heated. Heating element 36 may comprise a suitable length of insulated resistance wire of any well known type and is supported closely adjacent wall 24 of tube 22 by a generally elongate annular core or heater-wire support 38 which may be made from a suitable highly heat conductive material, such as aluminum, for example. Support 38 includes a depending leg 40 spacing the lower end 42 of support 38 sufficiently above bottom wall 26 of tube 22 such that the lower loops 44 of heating element 36 may be accommodated with loose tollerance, taking into consideration the nature of heating element 36.

Referring now more in particular to FIGS. 2 and 4–7, wire support 38 is designed to support six runs or segments of heating element 36 in elongated troughs 46 having an arcuate cross-section formed by stamping the troughs 46 into support 38 between elongated stiffeners 48. Wire support 38 also carries a pair of upstanding arms 50, 52 which support a suitable dielectric member 54 mounted inside tube 22 for receiving and supporting certain electrical components, to be hereinafter described, for controlling the operation of heating element 36. Support 38 also includes an upstanding spacer finger 56 which supports a ceramic separator 58 in tube 22 between arms 50, 52. Separator 58 has the cross-sectional shape shown in FIG. 5 and is provided with elongated, arcuate recesses 60, 62 for receiving similarly shaped members 64, 66 formed on arms 50, 52, respectively. Separator 58 is also provided with elongated, key-hole-like openings 68, 70 which receive female connectors 72, 74 affixed to ends 76, 78, respectively, of heating element 36.

The separator 58 is also provided with an opening 80 through which a spring conductor 82 and associated parts, to be hereinafter described, extend. Spring conductor 82 may be made from a suitable brass material and includes a first end 84 (FIG. 4), which is affixed to member 54 by a suitable screw 86, and a free end 88 (FIGS. 2 and 7), which carries a dielectric finger 90 and an electrical contact 92. Dielectric finger 90 includes a free end 94 positioned closely adjacent the free end 96 (FIGS. 2, 5 and 7) of a bimetallic element 98 having a fixed end 100 secured to wire support 38 in the manner shown in FIG. 7.

The bimetallic element 98 is an important feature of the invention and is used to interrupt the current supplied to the heater element 36 when the temperature of material contacting tube 22 externally of the latter exceeds a predetermined hazardous amount such, for example, as may happen when heater 10 is removed from its water environment and placed on a wooden table or like surface, the latter surface increasing in temperature at the point in contact with the heater. When this predetermined temperature is reached, the temperature of the exterior of the metal tube 22 in contact with the surface begins to approach the hazardous temperature of the heating element 36 and element 98 bends sufficiently to press finger 90 swinging contact 92 out of engagement with a contact 102 carried by a bus bar 104 having a U-shaped mid-portion 106 (FIG. 7) attached to member 54 (FIG. 2). Bus bar 104 includes an end 108 (FIG. 7) which is remote from the end 110 carrying contact 102 and which carries a contact 112 positioned adjacent a finger 114 on an adjustment lever 116 swingably mounted in member 54 on a pivot pin 118 for regulating the temperature at which the electrical circuit to the heating element 36 is interrupted by a bimetallic switch 120 having a fixed end 122 secured to member 54 by a screw 124 (FIG. 4) and a free end 126 carrying a contact 128 engageable with contact 112.

As illustrated in FIGS. 4 and 7, lever 116 includes an upper end 130 which carries a neon indicator lamp 132 housed within a translucent cover 134 made from a suitable vinyl material and formed integrally with a sealing gasket 136 positioned between flange 34 on tube 22 and tube support 18 for forming a water-tight seal between tube support 18 and all of the internal, electrical components of heater 10.

Current is supplied to heater 10 through an electrical cord 138 having its leads 140, 142 sealed in a vinyl sheath 144 formed integrally with gasket 136 and cover 134 and being seated in member 54.

Figure 3:
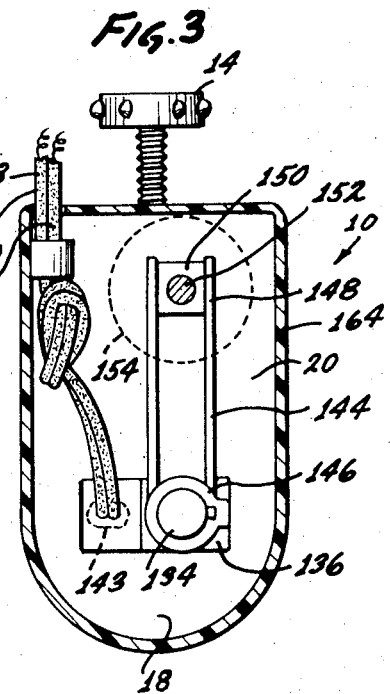
FIG. 3 is a cross-sectional view taken along the line 3—3 of FIG. 2.

The adjustable contact 112 may be adjusted through the intermediary of the manipulating lever 116 by a manipulating bar 144 (FIGS. 2 and 3) having a first end 146 encompassing the vinyl sheath or cover 134 adjacent end 130 of lever 116 for transmitting a force through the intermediary of cover 134 to lever 116 without interrupting the water-tight seal. Bar 114 includes a second end 148 in which a nut 150 is slideably mounted in operative association with an adjusting screw 152 having an exposed adjusting knob 154 provided on the upper end thereof. Adjusting screw 152 is provided with a small spindle 156 which is rotatably mounted in shelf 20 on tube support 18 and a counterbore 158 which receives a fixed pin 160 depending from a cover 162 having an encompassing side wall 164 engaging tube support 18. Cover 162 is provided with an aperture 166 through which a transparent domed cap 168 extends for covering sleeve or cover 134.

Arcing of contacts 112, 128 is minimized by a 0.01 microfarad capacitor 170 connecting lead 142 to bus bar 104. Lead 142 is also connected to bimetallic switch 120 by screw 124.

The neon bulb 132 is a conventional bulb of the type which includes a small resistor 172 in one of its filament leads 174 having an end 176 connected to lead 140, which, in turn, has an end 178 which carries a male connector 180 engaged in female connector 74. The other filament lead 182 of bulb 132 has an end 184 connected to screw 86 on spring conductor 82 which, in turn, has a lead 186 which carries a male connector 188 engaged in female connector 72 (FIGS. 4 and 5) on heating element 36 for completing a circuit through bulb 132 when element 36 is drawing current to indicate to a user of heater 10 that it is energized.

The electrical components within tube 22 are insulated therefrom by a dielectric sleeve 190 which may be either adhered to tube 20 or wrapped around the electrical components before the latter are inserted into tube 22.

Since the tube support 18 and the plug 30 serve as part of the enclosure to enclose live or energizeable parts, these elements should preferably be made from a material which will withstand certain mechanical abuse, abnormal operation and flammability tests after the parts have been conditioned for a period of 1,000 hours in an aging test oven having a temperature between 85°–105° C. One such plastic material which has been found to meet this test is a plastic material from a family of phenylene oxide based resins. One such material is sold by the General Electric Company under the trademark "NORYL."

In operation, as those skilled in the art will readily understand, the heater, pursuant to the present invention, may be mounted upon the side wall 12 of the aquarium such that the metallic tube 22 is at least partially submerged to a preferred minimum degree in the aquarium. As pointed out above, the finger 114 of the adjustment lever 116 may be utilized for regulating the relationship between the stationary yet adjustable contact 112 of the bus-bar 104 with that of the contact 128 provided on the bimetallic switching member 120 and, thereby, control the temperature at which the circuit to the heating element 36 will be interrupted or opened in response to a particular temperature level of the water externally of the heater.

Moreover, should the hobbyist, for some reason, remove the tube 22 from the confines of the water while the electrical circuit is in a condition of being energized through the intermediary of the electrical cord 138, the bimetallic element 98 will open the circuit at a particular temperature level of a surface upon which the metallic tube 22 is resting, this particular temperature level having been predetermined by the manufacturer in the manufacturer's predisposition of the relationship between the contact 92 provided on the spring conductor 82 with that of the contact 102 carried by the bus-bar 104, the bimetallic element 98 at the predetermined temperature bending inwardly of the support 38 so as to engage the finger 90 and cause the swinging of the contact 92 out of engagement with the contact 102 of the bus-bar 104. Once disengaged, the circuit will be opened and current will cease to flow to the heating element 36.

Clearly, as those skilled in the art will readily understand, the very close proximity of the bimetallic element 98 with that of the metallic support 38 results in a very sensitive arrangement wherein the bimetallic element 98 will readily respond to the temperature of the tube 22, the tube 22 having a temperature, in part, which corresponds to the temperature of the surface upon which the tube 22 is resting and which begins to approach that of the heater element 36. Thus, the bimetallic element 98 acts as a safety switching member or safety thermostat which will prevent continued operation and hazardous overheating of the heater beyond a particular temperature level, predetermined by the manufacturer.

The relationship between the bimetallic element 120 with that of the bimetallic element 98 is such that because of the rather large spacing between the heating element 36 and the bimetallic element 120, the latter is less sensitive to a temperature gradient between the external temperature levels and the heating element 36, than is the bimetallic element 98, since the bimetallic element 98 is connected to the heating element 36 and is directly responsive to the temperature gradient between the heating element 36 and an external medium. Therefore, notwithstanding the fact that the bimetallic element 98 is preadjusted by the manufacturer to open the circuit at a temperature of the external medium higher than that temperature at which the bimetallic element 120 is to open the circuit, since the bimetallic element 98 is in very close proximity with the heating element 36, whenever the metal tube 22 transfers heat to a surface such as a table surface externally of the water in the aquarium, the bimetallic element 98 will respond to the temperature of the external surface which is being increasingly heated, and if the latter temperature reaches that hazardous temperature at which the bimetallic element 98 is to become operative, the bimetallic element 98 will effectively open the circuit and prevent danger.

Accordingly, the safety feature of the present invention is a great improvement over the prior art, the safety feature relating not only to the fact that the entire heater may be fully submerged in water without electricuting the inhabitants of the aquarium and the hobbyist himself who may attempt to remove the submerged heater from the aquarium, but also to the fact that even should the heater be removed from the water and placed upon an external surface, the safety thermostat constituted by the bimetallic element 98 will effectively open the circuit to prevent fire or the like. Moreover, because of the nature of the materials of the tube support 18 and plug 30, such as that of the family of phenylene oxide based resin, the entire heater is much more durable.

Numerous alterations of the structure herein disclosed will suggest themselves to those skilled in the art. However, it is to be understood that the present invention which is for purposes of illustration only and is not to be construed as a limitation of the invention.

What is claimed is:

1. An aquarium heater comprising a housing, said housing being constituted at least in part of heat conductive material, electrical heating means extending in said housing for heating said housing to a temperature higher than ambient temperature, circuit means extending in said housing for supplying electrical current to said electrical heating means, and a pair of independently actuable thermostats operatively associated with said circuit means each for independently opening and closing said circuit means selectively in response to respective external temperature levels, one of said thermostats being responsive to a temperature level of a selected medium to be heated, the other of said thermostats being responsive to a temperature level higher than for said one thermostat and corresponding to a hazardous temperature of the housing which approaches the temperature of the heating means, the other of said thermostats including a bimetallic switching member in close proximity with said heating means, a heat conductive core extending in said housing and at least partially contacting said housing, said heating means including a heating element extending along said core, said bimetallic switching member including a fixed end portion connected to said core and a free end portion movable into and out of operative association with said circuit means.

2. An aquarium heater as claimed in claim 1 wherein said heat conductive material is metallic.

3. An aquarium heater as claimed in claim 1 wherein said housing includes means for completely sealing the interior thereof against fluid penetration thereinto.

4. An aquarium heater as claimed in claim 1 wherein the one of said thermostats is adjustable.

5. An aquarium heater as claimed in claim 4 wherein the other of said thermostats is operative for opening said circuit means at a greater external temperature than for the adjustable thermostat.

6. An aquarium heater as claimed in claim 4 wherein the other of said thermostats is constituted as a safety thermostat, said adjustable thermostat being remotely spaced from said heating means and, thereby, less sensitive to a temperature difference between said heating means and the exterior of the housing than said safety thermostat.

7. An aquarium heater comprising a housing, said housing being at least partially metallic, electrical heating means extending in said housing for heating said housing to a temperature greater than ambient temperature, circuit means extending in said housing for supplying electrical current to said electrical heating means, a thermostat operatively associated with said circuit means for selectively opening and closing said circuit means in response to external temperature levels, said thermostat including a bimetallic switching member in close proximity with said heating means, a metallic core extending in said housing and at least partially contacting said housing, said heating means including a heating coil extending along said metallic core, said bimetallic switching member including a fixed end portion connected to said metallic core and a free end portion movable into and out of operative association with said circuit means.

8. An aquarium heater as claimed in claim 7 wherein said metallic core includes an elongate annular wall provided with elongate parallel troughs spaced relative to one another along the periphery of said annular wall, said heating coil including a plurality of elongate segments seated in said troughs respectively.

9. An aquarium heater as claimed in claim 8 wherein said annular wall includes a partially slotted portion communicating the exterior of said core with the interior of the latter, the free end of said bimetallic switching member being movable through said slotted portion toward the interior of said core for opening said circuit means.

10. An aquarium heater as claimed in claim 9 wherein said circuit means includes a partially metallic lever having a movable dielectric free end extending into the interior of said core for being engaged by the free end of said bimetallic switching member, said thermostat including a stationary terminal operatively engageable by a metallic portion of said lever.

11. An aquarium heater as claimed in claim 10 wherein said circuit means includes a bus-bar at one end of which is disposed said stationary terminal, and a further bimetallic switching member operatively associated with the opposite end of said bus-bar.

12. An aquarium heater as claimed in claim 11 wherein the opposite end of said bus-bar includes a further stationary terminal adjustable relative to said further bimetallic switching member for being selectively moved relative to the latter.

13. An aquarium heater as claimed in claim 12 wherein said housing includes a pivotal arm having a free end engageable with the adjustable end of said bus-bar for moving the adjustable end relative to said further bimetallic switching member.

14. An aquarium heater as claimed in claim 13 wherein said pivotal arm includes an opposite end carrying a light source electrically connected to said circuit means for indicating the energized condition of the latter.

15. An aquarium heater as claimed in claim 14 wherein said housing includes fluid sealing means for preventing fluid penetration thereinto, said fluid sealing means permitting observation of said light source therethrough, and means for operating said pivotal arm externally of said housing through the intermediary of said fluid sealing means.

16. An aquarium heater as claimed in claim 15 wherein said fluid sealing means includes a portion which is translucent and a further portion which is deformable.

17. An aquarium heater as claimed in claim 16 wherein said housing includes an upper plastic portion in which is disposed said sealing means, said plastic portion being constituted of a phenylene oxide resin for durability.

* * * * *